US 9,784,093 B2

United States Patent
Bourgeois et al.

(10) Patent No.: US 9,784,093 B2
(45) Date of Patent: Oct. 10, 2017

(54) WELL WATER DEPTH MONITOR

(71) Applicant: WellGauge, Inc., Baltimore, MD (US)

(72) Inventors: Andre Emile Bourgeois, Baltimore, MD (US); Enrico Anthony Dicocco, Street, MD (US); Rodney Scott Bullard, Monrovia, MD (US); Stephen Vincent Whipple, Ijamsville, MD (US)

(73) Assignee: WellGauge, Inc.

( * ) Notice: Subject to any disclaimer, the term of this patent is extended or adjusted under 35 U.S.C. 154(b) by 163 days.

(21) Appl. No.: 14/705,880

(22) Filed: May 6, 2015

(65) Prior Publication Data
US 2015/0322771 A1 Nov. 12, 2015

Related U.S. Application Data

(60) Provisional application No. 61/990,183, filed on May 8, 2014.

(51) Int. Cl.
*G01F 23/00* (2006.01)
*E21B 47/04* (2012.01)
(Continued)

(52) U.S. Cl.
CPC .............. *E21B 47/04* (2013.01); *E03B 3/16* (2013.01); *E21B 47/042* (2013.01); *G01F 23/24* (2013.01)

(58) Field of Classification Search
CPC ........ G01F 23/284; G01F 23/00; G01F 23/26; G01F 23/0076; G01F 23/0069; G01F 23/266
(Continued)

(56) References Cited

U.S. PATENT DOCUMENTS 3,716,830 A * 2/1973 Garcia .................... E21B 47/18
367/83
3,922,914 A * 12/1975 Fuchs .................... G01F 23/284
324/643
(Continued)

FOREIGN PATENT DOCUMENTS

CN       102435541 A       5/2012
CN       202393677 U       8/2012
(Continued)

OTHER PUBLICATIONS

International Search Report dated Jul. 16, 2015 for PCT Application No. PCT/US2015/029544, filed on May 6, 2015, 2 pages.
(Continued)

*Primary Examiner* — John Fitzgerald
*Assistant Examiner* — Truong D Phan
(74) *Attorney, Agent, or Firm* — Mintz Levin Cohn Ferris Glovsky and Popeo, P.C.

(57) ABSTRACT

Methods, apparatuses, and computer readable medium including computer program products, are provided for determining the depth of water in a well. A method may include coupling a signal onto a cable connected to a submersible well pump. The method may further include monitoring the cable to determine a first time corresponding to a first reflection of the signal caused by the cable entering a water column between a water surface and the submersible pump. The method may further include monitoring the cable to determine a second time corresponding to a second reflection of the signal caused by an impedance mismatch between the cable surrounded by water and a motor in the submersible well pump. The method may further include determining a water height between the submersible pump and the water surface from the first time and the second time.

21 Claims, 5 Drawing Sheets

(51) Int. Cl.
*G01F 23/24* (2006.01)
*E03B 3/16* (2006.01)

(58) Field of Classification Search
USPC .................. 73/290 R; 702/55; 324/643
See application file for complete search history.

(56) References Cited

U.S. PATENT DOCUMENTS

| | | | |
|---|---|---|---|
| 4,135,397 A | 1/1979 | Krake | |
| 4,554,831 A * | 11/1985 | Sealey | G01F 23/26 340/620 |
| 4,621,264 A | 11/1986 | Yashiro et al. | |
| 4,866,302 A * | 9/1989 | Whiteley | G01R 13/342 257/31 |
| 5,275,040 A * | 1/1994 | Codazzi | E21B 21/08 166/254.1 |
| 5,426,264 A * | 6/1995 | Livingston | H01B 7/046 174/102 R |
| 5,634,522 A * | 6/1997 | Hershberger | E21B 43/12 166/372 |
| 5,781,019 A * | 7/1998 | Telder | G01F 23/284 324/632 |
| 5,856,783 A * | 1/1999 | Gibb | B67D 7/766 324/660 |
| 5,868,029 A * | 2/1999 | Paine | G01F 23/0038 73/290 R |
| 6,016,702 A * | 1/2000 | Maron | G01L 9/0039 250/227.14 |
| 6,121,780 A | 9/2000 | Cruickshank et al. | |
| 6,121,894 A | 9/2000 | Yankielun et al. | |
| 6,237,410 B1 | 5/2001 | Dyck et al. | |
| 6,681,626 B2 * | 1/2004 | Funfgeld | G01F 23/284 342/124 |
| 6,928,868 B2 * | 8/2005 | Ridenour | G01F 23/18 73/290 R |
| 6,956,381 B2 | 10/2005 | Dahan | |
| 7,040,145 B2 | 5/2006 | Drnevich et al. | |
| 7,634,945 B2 | 12/2009 | Champion | |
| 7,777,496 B2 | 8/2010 | Evans et al. | |
| 7,965,087 B2 | 6/2011 | Reimelt et al. | |
| 8,746,045 B2 | 6/2014 | Carvalho et al. | |
| 8,915,131 B2 | 12/2014 | Aughton et al. | |
| 8,947,102 B1 | 2/2015 | Evett et al. | |
| 2002/0070030 A1 * | 6/2002 | Smith | E21B 33/0407 166/379 |
| 2002/0121987 A1 * | 9/2002 | Besser | H01B 7/046 340/854.9 |
| 2002/0166378 A1 | 11/2002 | Bilinski et al. | |
| 2004/0154390 A1 * | 8/2004 | Baustad | E21B 47/01 73/152.55 |
| 2005/0217350 A1 * | 10/2005 | Jabusch | E21B 43/006 73/64.55 |
| 2005/0285706 A1 * | 12/2005 | Hall | E21B 17/028 336/132 |
| 2008/0067116 A1 * | 3/2008 | Anderson | E21B 47/042 210/100 |
| 2011/0000295 A1 * | 1/2011 | Kritlow | G01F 23/18 73/299 |
| 2011/0051297 A1 * | 3/2011 | Knox | E21B 47/0007 361/23 |
| 2011/0081256 A1 * | 4/2011 | Thompson | E21B 47/042 417/53 |
| 2012/0041692 A1 * | 2/2012 | Suk | E03B 3/06 702/45 |
| 2012/0084055 A1 * | 4/2012 | Smithson | E21B 47/042 702/166 |
| 2013/0108474 A1 | 5/2013 | Thompson et al. | |
| 2014/0009302 A1 | 1/2014 | Singer et al. | |
| 2014/0124210 A1 * | 5/2014 | Dowell | G01F 23/284 166/336 |
| 2014/0159743 A1 | 6/2014 | Dayal et al. | |
| 2014/0195174 A1 | 7/2014 | Machuga | |

FOREIGN PATENT DOCUMENTS

| | | |
|---|---|---|
| CN | 203572781 U | 4/2014 |
| FR | 2958041 A1 | 9/2011 |
| SU | 498495 A1 | 3/1976 |

OTHER PUBLICATIONS

Written Opinion dated Jul. 16, 2015 for PCT Application No. PCT/US2015/029544, filed on May 6, 2015, 3 pages.

* cited by examiner

WELL WATER DEPTH MONITOR

CROSS-REFERENCE TO RELATED APPLICATIONS

This application claims priority to U.S. Provisional Patent Application 61/990,183 filed May 8, 2014, entitled "Well-Guage," the contents of which are hereby incorporated by reference in its entirety.

FIELD

The subject matter disclosed herein relates to equipment used to determine the water depth in a well.

BACKGROUND

Measuring the water level in a water well may allow identification of well-production problems before they cause further problems such as water outages and pump damage. Some drinking water rules require water systems to maintain records of static well-water levels on a seasonal basis including low demand and high demand periods. Issues that cause reduced well production may include: bacterial growth or mineral deposits that plug well casing slots or screens; over-pumping that may cause a drop in the aquifer level; and/or problems with the operation of the well pump or pump motor. Periodically measuring the static water level and the pumping water level over a number of years may reveal any seasonal variations to water levels in the aquifer, and show trends on how the well performs.

SUMMARY

Methods, apparatuses, and computer readable medium including computer program products, are provided for determining the depth of water in a well. A method may include coupling a signal onto a cable connected to a submersible well pump. The method may further include monitoring the cable to determine a first time corresponding to a first reflection of the signal caused by the cable entering a water column between a water surface and the submersible pump. The method may further include monitoring the cable to determine a second time corresponding to a second reflection of the signal caused by an impedance mismatch between the cable surrounded by water and a motor in the submersible well pump. The method may further include determining a water height between the submersible pump and the water surface from the first time and the second time.

In some variations, one or more of the features disclosed herein including the following features can optionally be included in any feasible combination. The method may include determining the water height from a difference between the first time and the second time, wherein the water height is a distance in the water column between the submersible pump and the water surface. The method may further include determining based on the first time a cable length between a point corresponding to the launching of the signal and the water surface. The method may further include determining based on the second time a cable length between a point corresponding to the launching of the signal and the motor in the submersible pump. The signal may include a voltage step. The cable may include a power cable providing power to the submersible pump. The water height may be sent wirelessly to at least one of a user equipment or a computer. The cable may be insulated. The cable may include one or more metal conductors.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1B:
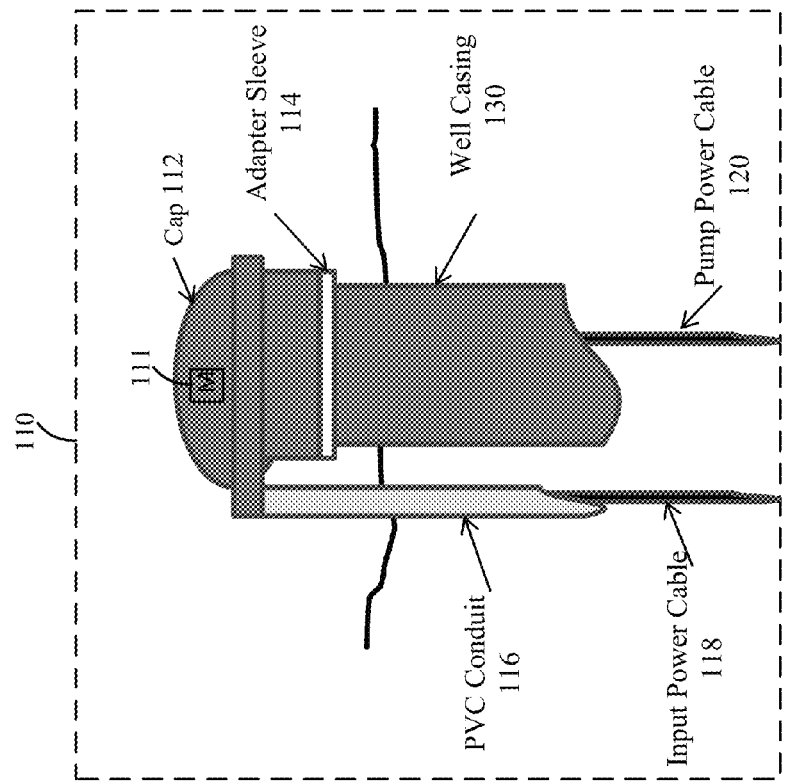
FIG. 1B depicts an exploded view of a well head, in accordance with some example embodiments.

Like labels are used to refer to same or similar items in the drawings.

DETAILED DESCRIPTION

The subject matter disclosed herein relates to determining the depth of water in a water well. A water well may be drilled to a sufficient depth to cause water to enter a well casing extending from the bottom of the well to the earth's surface. For example, a water well may drilled to a depth of 150 feet and a well casing may have an eight inch diameter. In some example embodiments, a submersible pump may be suspended in the well casing. The pump may be suspended from a drop pipe of smaller diameter than the casing. For example, the drop pipe may be one inch in diameter. The submersible pump may be suspended at a pump height above the bottom of the well to reduce or prevent sediment from the bottom of the well from being drawn into the submersible pump. For example, the submersible pump may be suspended 20 feet from the bottom of the well. Water enters the well and fills the well casing with water to a water height. The depth of water in the well casing available to pump to a storage tank or for use by a water user is the water in the well casing between the pump height and the water height. Water below the pump height may not be available to the submersible pump because the submersible pump water inlet may be at the pump height.

Although the previous example describes the pump power cable carrying the launched signal, other types of cables may also carry the launched signal. For example, a signal cable may be used that extends through the water surface to the submersible pump or other device associated with the pump. The cable may include one or more metallic conductors, non-metallic conductors, or optical fibers may be used as well. In some example embodiments, one or more conductors may be insulated or non-insulated.

In some example embodiments, the difference in height between the pump height and the water height may be determined from a signal launched on a cable, or coupled to the cable, running from the submersible pump to at least the water height in the casing. For example, the submersible pump may be electrically powered via a power cable extending from the top of the well at the well cap. The signal may be launched or coupled to the power cable so that the power cable carries the launched signal in addition to providing power to the pump. In some example embodiments, the distance between the pump height in the casing and the water height in the casing may be determined from a first reflection of the launched signal due to an impedance mismatch at the water height, and a second reflection due to an impedance mismatch at the submersible pump height. The time difference between the first reflection and the second reflection may correspond to the height of the water between the top of the water in the casing and the submersible pump positioned deeper in the casing. In this way, the height of the water column in the well casing that is available to be pumped by the submersible pump may be monitored over time. For example, a homeowner may monitor the height of the available water column over hours, days, weeks, months, and/or years.

In some example embodiments, the current drawn by the submersible pump motor may be monitored via a series shunt placed in the power line to the pump. The voltage across the shunt may be representative of the current consumed by the motor. In some example embodiments, the current consumed by the motor over time may be monitored. In some embodiments, a level switch or pressure switch may be included with a storage tank. The level switch or pressure switch may cause the pump to run when the tank is not full or at a prescribed height. The run time of the motor between when the level switch or pressure switch causes the pump to run to when the level switch or pressure switch causes the pump to stop may be monitored over time as a pump motor runtime.

In some example embodiments, an existing cable used to power the submersible pump may be used in accordance with the foregoing to determine the height of the available water column in the well, and to monitor the current draw and run time of the pump over periods of time to monitor the health of the well and the pump. In some example embodiments, installation of an apparatus consistent with the foregoing is simplified, safer, less intrusive, and less expensive because the existing power cable to the pump may be used to determine the height of the available water column.

Figure 1A:
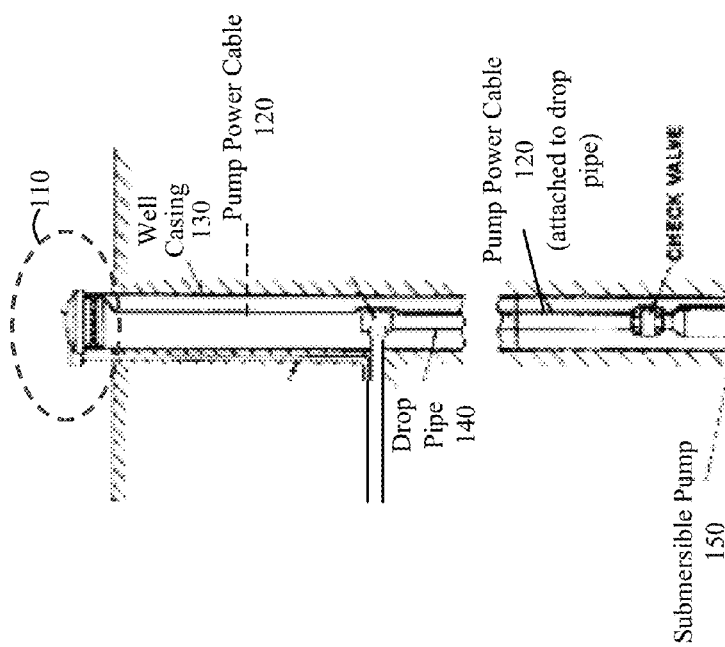
FIG. 1A depicts a submersible pump suspended from a drop pipe in a well casing, in accordance with some example embodiments.

FIG. 1A depicts a submersible pump suspended from a drop pipe in a well casing, in accordance with some example embodiments. FIG. 1B depicts an exploded view of the well head 110, in accordance with some example embodiments. Well head 110 may be attached to the top of the well casing 130. Submersible pump 150 may be submerged in water and may be attached to the bottom of drop pipe 140. Pump power cable 120 may run from well head 110 to submersible pump 150.

Well head 110 may be located at the top of well casing 130. Well head 110 may include cap 112 to cover the top of well casing 130 and enclose monitoring electronics 111. Monitoring electronics 111 may include a battery that may be used to power the monitoring electronics. An input power cable 118 may enter well cap 112 to provide source power to submersible pump 150. In some embodiments, input power cable 118 may be placed inside a conduit such as polyvinyl chloride (PVC) conduit 116 to protect the input power cable from damage as may be required by building codes. Electrical connection may be made between the input power cable 118 and the pump power cable 120. Monitoring electronics 111 inside the cap 112 may also connect to input power cable 118 and pump power cable 120. For example, the battery in monitoring electronics 111 may be charged when electrical power is provided at input power cable 118. In some embodiments, submersible pump 150 may include a 120 volt alternating current (VAC) pump. A pump motor using any other alternating current or direct current voltage may be used as well. In this example, when 120 VAC is provided on input power cable 118, a battery charger that is part of monitoring electronics 111 may charge the battery as well as provide power to the monitoring electronics 111 and pump 150. When no power is supplied on input power cable 118, the monitoring electronics 111 may be powered by the battery.

Pump power cable 120 may run from the monitoring electronics 111 located in cap 112, through well casing 130, to submersible pump 150. Power flowing from the input power cable through the cap 112 and monitoring electronics 111 to submersible pump 150 may cause submersible pump 150 to pump water surrounding the pump into drop pipe 140. Water may be supplied to a tank, house, and/or water user through drop pipe 140. In some example embodiments, pump power cable 120 may be attached to the exterior of drop pipe 140.

Pump power cable 120 may include two, three, or more solid or stranded wires. Each wire may include an insulating jacket. For example the wires may have jackets made of polyvinyl chloride (PVC), polyethylene (PE), polypropylene (PP), polyurethane (PUR), chlorinated polyethylene (CPE), Teflon, silicone, rubber, or any other electrically insulating material. The insulated wires may be twisted together. The pump power cable 120 may include an outer jacket that surrounds the insulated wires in a second insulating outer jacket. For example, pump power cable 120 may include two wires, and the like. In this example each wire may have polyethylene insulation around the wire. Continuing the example, the two insulated wires may have a polyethylene jacket surrounding the two insulated wires. Although the previous example describes two insulated wires that are not twisted together inside an outer insulating jacket, other types of cables that include insulated wires that are twisted together with or without an outer jacket may be used as well.

In some example embodiments, the wires may be arranged to be in proximity to each other which may cause a characteristic impedance between the wires. In some example embodiments, electromagnetic fields may couple energy between the wires. The electromagnetic fields may be present in the insulating jackets surrounding each wire. The electromagnetic fields may extend into the outer jacket surrounding the two (or more) wires. The electromagnetic fields may extend beyond the outer jacket into the surrounding space. The characteristic impedance may be determined at least in part by the proximity of the wires, the insulation surrounding each wire, whether the wires are twisted together, whether there is an outer jacket, and/or the medium surrounding the wires (e.g. air, water, or some other liquid). In the previous example, if the two wires do not have a surrounding jacket but are twisted together, electromagnetic fields may couple the two wires creating a characteristic impedance that may be the same or different from the characteristic impedance when the two wires have an outer insulating jacket.

In some example embodiments, a voltage step may be generated or induced on the pump power cable 120 by monitoring electronics 111. The voltage step may propagate along the pump power cable 120 toward the submersible pump 150. Continuing the previous example, the characteristic impedance of the cable may be determined by at least the polyethylene jacket around each wire, the outer polyethylene jacket around both wires, whether the two wires are twisted inside the outer jacket, and the medium outside the outer jacket. Continuing the previous example, the medium outside the outer jacket may be air between the cap 112 and the surface of the water in the well casing 130 causing a first characteristic impedance. At the water height in the well casing, the medium surrounding the pump power cable 120 may change from air to water. The change in medium surrounding the pump power cable 120 may cause a change in the characteristic impedance of the pump power cable. The change in characteristic impedance of the pump power cable may cause a reflection of a portion of the voltage step generated by the monitoring electronics 111. The reflected voltage step may propagate back toward the monitoring electronics where the monitoring electronics 111 detects the reflected step. A time may be recorded corresponding to the arrival of the first reflected step from the impedance mismatch caused where the pump power cable enters the water. In some example embodiments, the time between when the step was launched at the monitoring electronics 111 and the arrival of the first reflected voltage step corresponds to the time taken for the voltage step to propagate from the monitoring electronics 111 to the surface of the water and back. The distance or length of the pump power cable 120 between the monitoring electronics 111 and the surface of the water in the well casing may be determined from a difference between the time of the launched voltage step and the arrival time of the first reflected step. The difference in time may be referred to as a propagation time. The speed of the signal propagating along the pump power cable may be known by calibration or may be approximated based on the type of cable. Using the speed of propagation and the time between the launched signal and the reflected signal described in the foregoing, a distance corresponding to the time may be determined.

A portion of the voltage step may continue to propagate along the pump power cable 120 toward the motor in the submersible pump 150. In some example embodiments, the motor in the submersible pump may have a different impedance from the characteristic impedance of the pump power cable 120 surrounded by the water in the well casing. The different impedance of the pump motor compared to the pump power cable surrounded by water characteristic impedance may cause a second reflection of the voltage step that may propagate back to monitoring electronics 111. The second reflection may be detected by the monitoring electronics 111. In some example embodiments, the time between when the step was launched at the monitoring electronics 111 and the arrival of the second reflected voltage step corresponds to the time taken for the voltage step to propagate from the monitoring electronics 111 to the motor in the submersible pump 150 and back. The distance or length of the pump power cable 120 between the monitoring electronics 111 and the submersible pump motor may be determined from a difference between the time of the launched voltage step and the arrival time of the second reflected step.

The height of the water column available for the submersible pump 150 to pump out through drop pipe 140 corresponds to the time difference between the arrival times at monitoring electronics 111 of the first reflection and the second reflection. The difference in time between the arrival of the first and second reflections corresponds to the round-trip transit time along the pump power cable through the water column between the surface of the water and the motor in the submersible pump 150.

Cap 112 may mechanically interface to adapter sleeve 114 to adapt the well cap 112 to different well casing 130 diameters. For example, well cap 112 may accommodate casing diameter up to a predetermined size, such as 6 inches (although other sizes may be used as well). An adapter sleeve 114 may be used to adapt an 8 inch well cap 112 to a 6 inch, 8 inch, and/or 10 inch well casing 130 diameter. Any other diameter of well cap and/or well casing may also be used by modifying adapter sleeve 114.

Well casing 130 may comprise a tube made of one or more materials. For example, well casing 130 may comprise a metal tube near the earth's surface to provide structural rigidity to the well components. Part way down the casing the material may be changed to another material such as PVC or any other material. In some example embodiments the well casing may comprise the same material from the ground surface to the bottom of the well. Well casing 130 may have any diameter such as 6 inch, 8 inch, 12 inch, or any other diameter.

Drop pipe 140 may comprise a tube made of one or more materials. For example, drop pipe 140 may comprise a polyethylene tube from the well cap to the submersible pump. In some example embodiments the drop pipe may change materials at some point between the cap 112 and submersible pump 150. Fittings may be used to adapt the drop pipe to the submersible pump 150. Drop pipe 140 may have any diameter smaller than the well casing. For example, the drop pipe may be one inch in diameter.

Submersible pump 150 may include any type of alternating current or direct current motor coupled to a pump. In some example embodiments, the motor in submersible pump 150 may be a 220 VAC motor. In some example embodiments, the motor may be a 24 VDC motor, although motors operating at other voltages also may be used.

Figure 2:
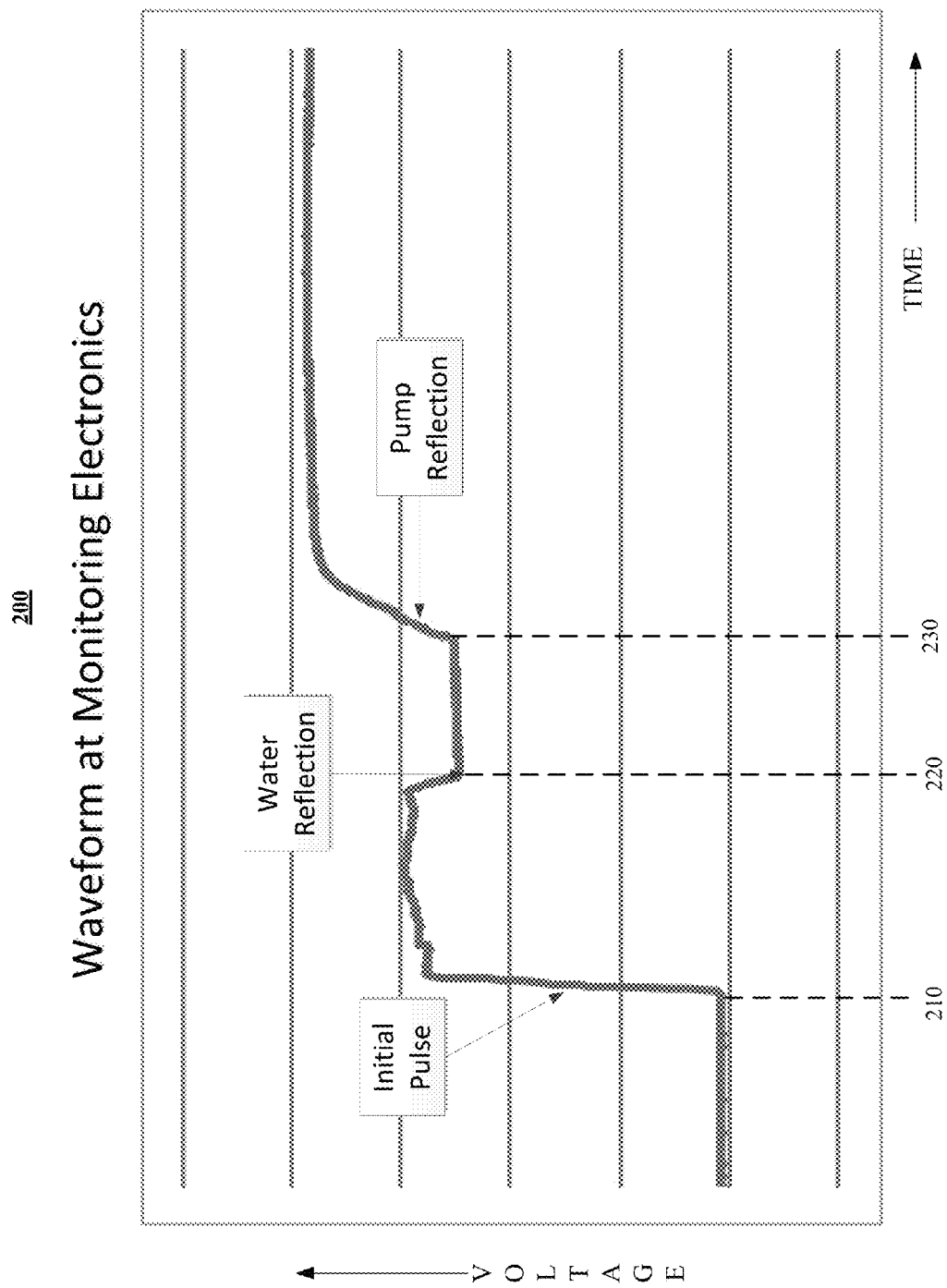
FIG. 2 depicts an example signal waveform, in accordance with some example embodiments.

FIG. 2 depicts an example waveform at the monitoring electronics, in accordance with some example embodiments. FIG. 2 refers to FIG. 1. A voltage step may be launched at the monitoring electronics 111 at 210. The voltage step may propagate along the pump power cable 120 toward the motor in the submersible pump 150. At 220, a first reflection corresponding to a reflection from the water surface may arrive at the monitoring electronics at a later time determined by the length of the pump power cable between the monitoring electronics and the surface of the water in the well casing 130. At 230, the second reflection corresponding to a reflection from the pump motor may arrive at the monitoring electronics at a time later than the first reflection. The later arrival time of the second reflection may be determined at least in part by the length of the pump power cable between the monitoring electronics and the motor.

At 210, monitoring electronics 111 may launch a voltage step onto the pump power cable 120. The voltage step may propagate along the pump power cable 120 toward the motor in the submersible pump 150. The voltage step may have a rise time of about one to ten nanoseconds. The voltage step rise time may be selected based on an accuracy and/or resolution needed in the determination of the water column height above the submersible pump 150. For example, slower rise times may correspond to less accuracy and/or resolution of the distances between the monitoring electronics and the water height, and between the monitoring electronics height and pump height. For example, a rise time slower than one nanosecond may correspond to an accuracy and/or resolution of greater than approximately one foot. Faster rise times may correspond to an accuracy and/or resolution of less than approximately one foot. Although the forgoing discloses using a voltage step as the signal that may be reflected at the surface of the water in the well casing 130 and from the motor in the submersible pump 150, other signals shapes may be used as well. For example, the signal may include a pulse or impulse such as a Gaussian shaped pulse, triangular pulse, sinusoidal shaped pulse or any other shape.

At 220, a first reflection may be generated by an impedance discontinuity at the point along the pump power cable 120 where the cable becomes submerged into the water in the well casing 130. In some example embodiments, the first reflection of the step may cause a reduction in the voltage of the step that propagates back to the monitoring electronics 111. For example, when the impedance of the pump power cable 120 surrounded by air is greater than the characteristic impedance of the pump power cable surrounded by water, the reflection may cause a decrease in the voltage of the step that propagates back to the monitoring electronics. In the example of FIG. 2, the voltage at 220 corresponds to a reflected step from a lower characteristic impedance where the pump power cable enters the well casing water. The time difference between 210 and 220 corresponds to the length of the pump power cable between the monitoring electronics 111 and the surface of the water in the well casing.

At 230, a second reflection may be generated by an impedance discontinuity between the power cable 120 below the water surface and the motor in the submersible pump 150. In some example embodiments, the second reflection of the voltage step may cause an increase in the voltage of the step that propagates back to the monitoring electronics 111. For example, when the impedance of the motor in the submersible pump 150 is greater than the characteristic impedance of the submerged pump power cable 120, the reflection causes an increase in the voltage of the step that propagates back to the monitoring electronics 111. In the example of FIG. 2, the voltage at 230 corresponds to a reflected step from a higher impedance motor than the submerged pump power cable 120. The time difference between 220 and 230 corresponds to the length of the pump power cable 120 between the surface of the water in the well casing 130 and the motor in the submersible pump 150. Monitoring electronics 111 initiates the voltage step that is coupled to the pump power cable 120, detects the first and second reflections, and determines distances from the times that the reflections are received including the height of the water column between the submersible pump and the surface of the water in the well casing.

Figure 3:
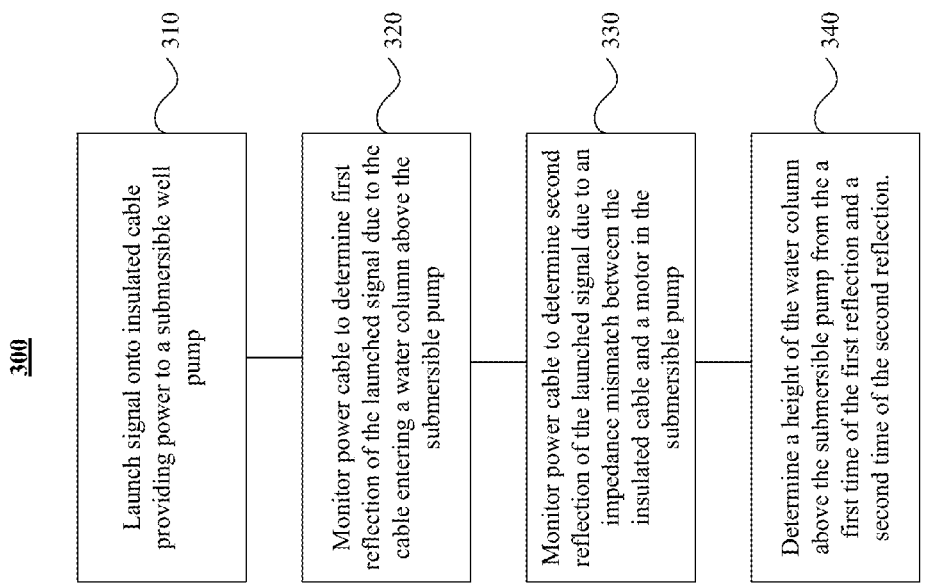
FIG. 3 depicts an example of a process, in accordance with some example embodiments.

FIG. 3 depicts an example of a process, in accordance with some example embodiments. FIG. 3 refers to FIGS. 1 and 2. At 310, a signal is launched onto an insulated power cable that provides power to a well pump. At 320, the voltage on the power cable is monitored to determine a first reflection of the signal caused by a change of the medium surrounding the power cable 120 from air to water. At 330, the voltage on the pump power cable 120 is monitored to determine a second reflection of the voltage step caused by the difference in impedance between the submerged power cable and the motor in the submersible pump 150. At 340, the height of the water column between the submersible pump 150 and the water surface in the well casing may be determined from a difference in the arrival times between the first reflection from the water surface and the second reflection from the motor in the submersible pump.

At 310, a signal is launched onto an insulated power cable that provides power to a submersible pump 150. In some example embodiments, a voltage step may be generated on the pump power cable 120 by monitoring electronics 111. The voltage step may propagate along the pump power cable 120 toward the submersible pump 150. The characteristic impedance of the cable may be determined by at least the jacket around each wire, whether there is an outer jacket around the wires, whether the wires are twisted, and the medium outside the outer jacket. The medium outside the outer jacket may be air between the cap 112 and the surface of the water in the well casing 130 causing a first characteristic impedance. At the water height in the well casing, the medium surrounding the pump power cable changes from air to water. The change in medium surrounding the pump power cable 120 may cause a change in the characteristic impedance of the pump power cable. The change in impedance of the pump power cable 120 may cause a reflection of a portion of the voltage step generated by the monitoring electronics 111 that is propagating along the pump power cable 120.

At 320, the voltage on the power cable may be monitored to determine a first reflection of the voltage step caused by the medium surrounding the power cable changing from air to water. The reflected voltage step may propagate from a location corresponding to the water surface back toward the monitoring electronics 111. The monitoring electronics 111 may detect the reflected step as a first reflection. In some example embodiments, a time may be recorded corresponding to the arrival of the first reflection from the impedance discontinuity caused by the pump power cable entering the water. In some example embodiments, the time between when the step was launched at the monitoring electronics 111 and the arrival of the first reflection may correspond to the time taken for the voltage step to propagate from the monitoring electronics 111 to the surface of the water and back. The propagation time may correspond to a cable length or distance between the monitoring electronics 111 and the water surface.

At 330, the voltage on the power cable may be monitored to determine a second reflection of the voltage step caused by the difference in impedance between the submerged pump power cable 120 and the motor in the submersible pump 150. A portion of the voltage step from the monitoring electronics may continue to propagate along the submerged pump power cable 120 toward the motor in the submersible pump 150. In some example embodiments, the motor in the submersible pump may have a different impedance from the characteristic impedance of the pump power cable 120 surrounded by the water in the well casing. The different impedance of the pump motor compared to the pump power cable surrounded by water characteristic impedance may cause a second reflection of the voltage step that may propagate back to monitoring electronics 111. The second reflection may be detected by the monitoring electronics 111. In some example embodiments, the time between when the step was launched at the monitoring electronics 111 and the arrival of the second reflected voltage step corresponds to the time taken for the voltage step to propagate from the monitoring electronics 111 to the motor in the submersible pump 150 and back. The propagation time may correspond to a cable length or distance between the monitoring electronics 111 and the motor in submersible pump 150.

At 340, the height of the water column available for the submersible pump 150 to pump out through drop pipe 140 corresponds to the time difference between the arrival at the monitoring electronics 111 of the first reflection and the second reflection. The difference in time between the arrival of the first and second reflections corresponds to the round-trip transit time of the voltage step along the pump power cable 120 through the water column between the surface of the water and the motor in the submersible pump 150. The round-trip transit time corresponds to the distance between the surface of the water and the submersible pump (the height of the water column above the pump).

Figure 4:
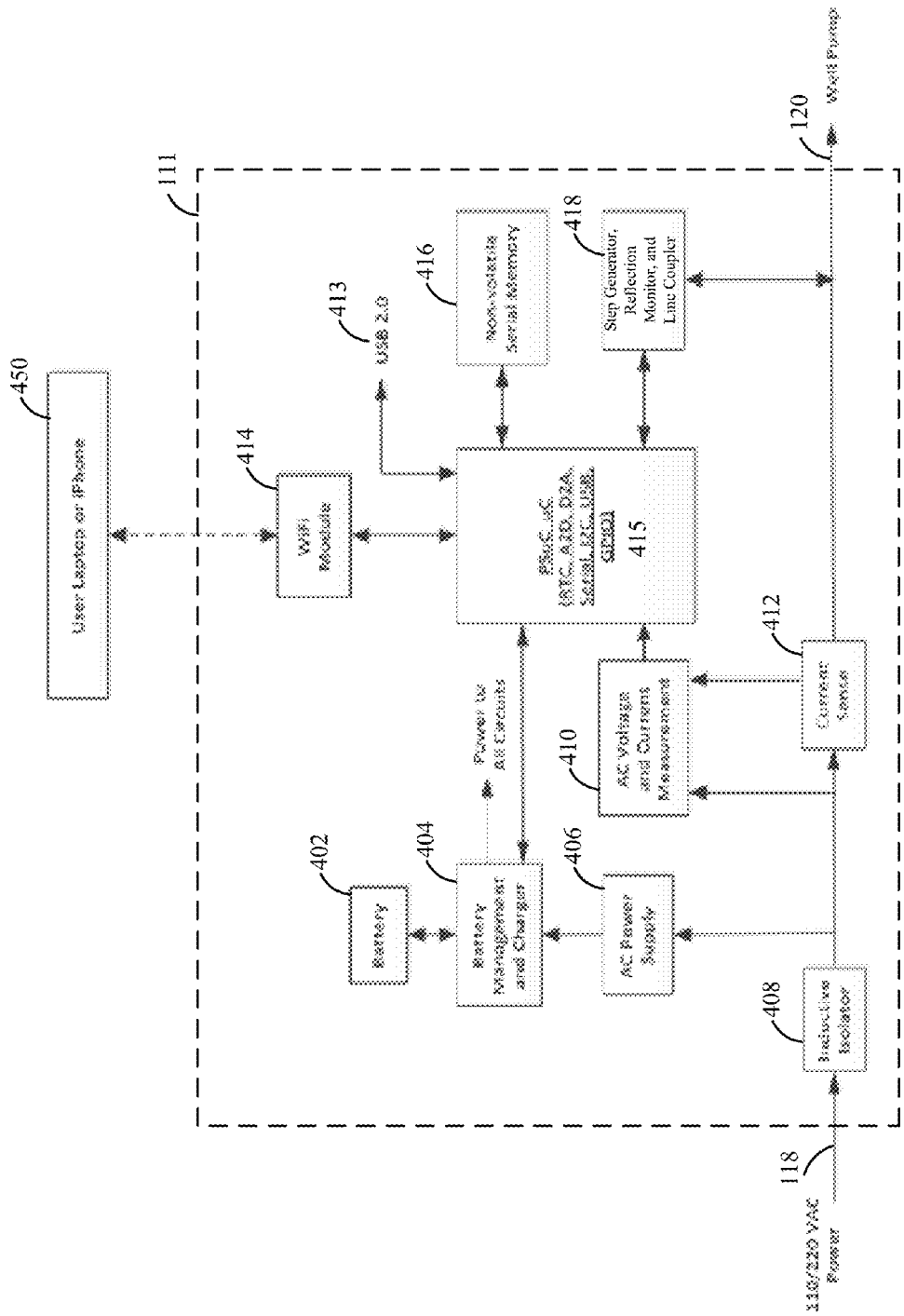
FIG. 4 depicts an example of an apparatus, in accordance with some example embodiments.

FIG. 4 depicts an apparatus, in accordance with some example embodiments. The description of FIG. 4 also refers to FIGS. 1-3. The apparatus may include monitoring electronics such as monitoring electronics 111 enclosed in a well cap such as cap 112. For example, the apparatus may include one or more processors 415, memory 416, a network interface such as WiFi module 414 or other wired or wireless interface, universal serial bus (USB) interface 413, battery 402, battery manager and charger 404, power supply 406, inductive isolator 408, pump motor voltage and current monitor 410, shunt/current sensor 412, and step generator, reflection receiver, and line coupler 418. Monitoring electronics 111 may interface to an external or remote device 450 such as a mobile phone or other computing device via the internet, wireless network, or wired network. Monitoring electronics 111 may include any type of analog and/or digital electronics. For example monitoring electronics 111 may include discrete electronic components (e.g. resistors, capacitors, inductors, transistors, and the like), amplifiers, comparators, mixers, oscillators, analog-to-digital converters, digital-to-analog converters, processors, memory, and/or any other electronic component. The one or more processors 415 may be used to calculate time differences between the launched signal and received reflections, and/or calculate lengths, distances, and/or heights from times. The one or more processors and memory may be used to generate a user interface such as a web page that may be accessed via a wireless or wired network. In some embodiments, the monitoring electronics 111 may be located outside the cap 112 such as in a garage, outbuilding, house, or enclosure.

Step generator, reflection monitor, and line coupler 418 may include circuitry to generate a voltage step that may be launched or coupled onto the pump power cable 120. In some example embodiments, the voltage step signal may be injected/coupled onto the well pump power cable 120 through a high-pass filter that allows the fast rise time pulses to pass while preventing the low-frequency alternating current power from passing. In some example embodiments, a low-pass filter may be inserted into the well pump power line 120 between the power source and where the voltage step is injected onto the power cable 120. The low-pass filter may prevent the fast rise-time voltage step from propagating towards the power source which may cause erroneous reflections. Step generator, reflection monitor, and line coupler 418 may include circuitry to monitor the pump power cable for reflections such as reflections from the water surface and the pump motor. Step generator, reflection monitor, and line coupler 418 may include any type of analog and/or digital circuit component such as the above-noted circuit components. Although the forgoing discloses using a voltage step as the signal that may be reflected at the surface of the water in the well casing and from the submersible pump motor, other signals shapes may be used as well. For example, the signal may include a pulse or impulse such as a Gaussian shaped pulse, triangular pulse, sinusoidal shaped pulse or any other shape.

Current sensor/shunt 412 may be used to monitor the current drawn by the motor in the submersible pump. The current draw may be recorded over time and may be used as an indicator to detect faults in the motor and/or pump. The motor runtime needed between a time when a float switch in a storage tank causes the pump to turn-on and the time the float switch causes the pump to turn-off may be recorded as a motor runtime. The motor runtime may be recorded over time and may be used as an indicator of a fault in the motor and/or pump. For example, if the motor runtime has increased over time the pump may be performing less efficiently due to clogging by debris, or the motor may be running longer due to a failing motor.

In some example embodiments, processor 414 and memory 416 may generate a user interface from which the water height in the well casing, motor current draw history, and/or motor runtime history may be viewed. In some example embodiments, commands may be issued via the user interface to cause the changes in the monitoring electronics and/or user interface.

Figure 5:
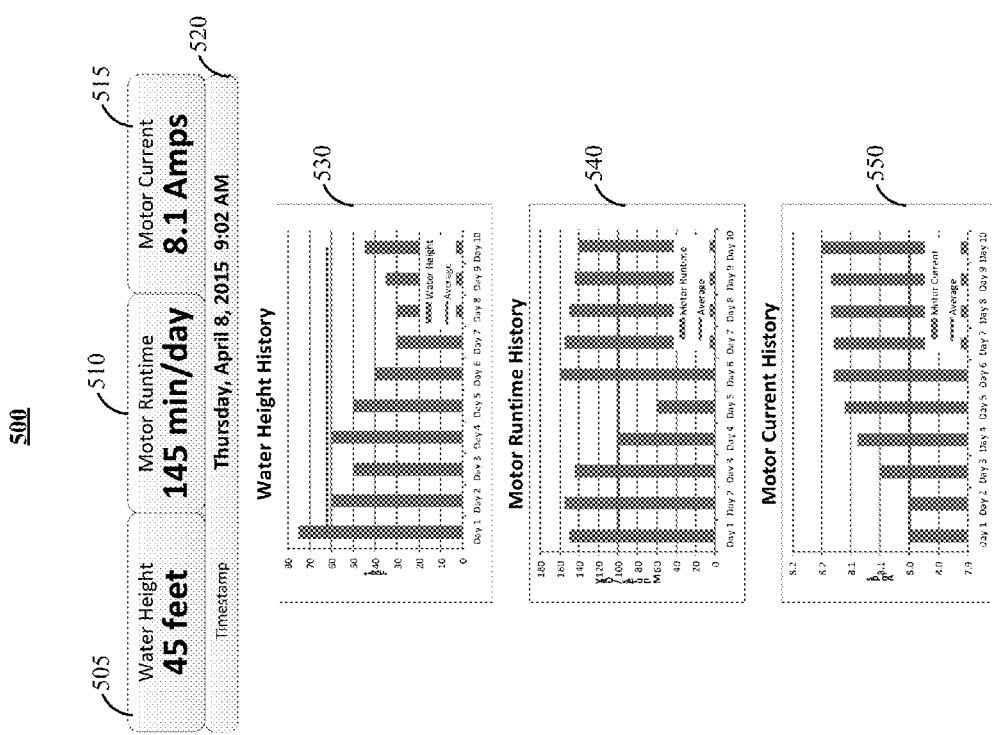
FIG. 5 depicts an example screenshot from a user interface, in accordance with some example embodiments.

FIG. 5 depicts an example screenshot from a user interface, in accordance with some example embodiments. FIG. 5 refers to FIGS. 1-4. User interface screen 500 may include the water height 505 which may display the height of the water column between the submersible pump 150 and the surface of the water in the well casing 130. The user interface screen 500 may further include the motor runtime 510 which may display the submersible pump runtime over a predetermined time period such as an hour, a day, a week, and so on. The motor runtime may be an average runtime over more than one day, may be a maximum motor runtime, minimum runtime, or other indicator of runtime. The user interface screen 500 may further include the motor current draw 515 which may display the submersible pump current draw over a predetermined time period such as an hour, a day, a week, and so on. The motor current draw may be an average current draw over more than one day, may be a maximum current draw, minimum current draw, or other indicator of current draw. The user interface screen 500 may further include timestamp 520 indicating a current date and/or time, a date and/or time when the pump was last run, and so on.

User interface screen 500 may include any type of graph showing a history of water height at 530, a motor runtime history at 540, and/or motor current draw history 550. Other graphs or representations of the water height, motor runtime, and/or motor current draw may be generated at user interface screen 500. In some example embodiments, commands may be sent to monitoring electronics 111 via the user interface screen 500 (commands are not shown in FIG. 5). For example, a command may be sent to clear one or more histories, set alarm levels, cause automatic uploads of pump and well data to a file transfer protocol (ftp) site, configure an electronic notification, as well as other commands. For example, a user may set an alarm to generate an email and/or text message when the water height drops below a configured height, for example 15 feet. Monitoring electronics 111 may generate and send an email and/or text message to at address configured in the electronic notification.

In some example embodiments, user interface screen 500 may be accessible via any computing device connected to the internet and/or a private network. For example, a smartphone connected to the internet may access interface screen 500 by accessing an appropriate uniform resource locator (URL). In some example embodiments, a user may be required to be authenticated via a username and/or password before access to the well pump user interface screen 500.

Although the forgoing description has been directed toward a depth of water in a water well, the same methods/apparatuses may be used to determine the depth of water in a tank. In some example embodiments, instead of water another liquid may be used. For example, the liquid in a well or tank may be oil, fuel, or any other liquid.

The subject matter described herein may be embodied in systems, apparatus, methods, and/or articles depending on the desired configuration. For example, the monitoring electronics disclosed herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (e.g., magnetic discs, optical disks, memory) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims. Furthermore, the specific values provided in the foregoing are merely examples and may vary in some implementations.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
   a monitoring circuit configured to couple between a power source and a power cable connected to a submersible well pump; and
   a removable well head cap comprising an adapter interface for connecting the removable well head cap to a water well casing at a surface level, the removable well head cap enclosing the monitoring circuit,
   wherein the monitoring circuit is configured to at least couple a signal onto the power cable, the signal comprising a voltage step,
   wherein the monitoring circuit is further configured to at least monitor the power cable to determine a first time corresponding to a reduction in at least a voltage of the voltage step, the reduction based on the signal reaching a water surface above the submersible pump,
   wherein the monitoring circuit is further configured to at least monitor the power cable to determine a second time corresponding to an increase in at least the voltage of the voltage step, the increase based on an impedance mismatch between the power cable surrounded by water and a motor in the submersible well pump, the increase in the voltage occurring after the reduction in the voltage, and
   wherein the monitoring circuit is further configured to at least determine a water height between the submersible pump and the water surface from at least the first time and the second time.

2. The apparatus of claim 1, wherein the water height is determined based on at least a difference between the first time and the second time.

3. The apparatus of claim 1, wherein a cable length between a point corresponding to a launching of the signal and the water surface is determined based on at least the first time.

4. The apparatus of claim 1, wherein a cable length between a point corresponding to a launching of the signal and the motor is determined based on at least the second time.

5. The apparatus of claim 1, wherein the monitoring circuit is further configured to at least generate the voltage step with an initial rising voltage duration between one and ten nanoseconds, and wherein the initial rising voltage occurs before the reduction in the voltage.

6. The apparatus of claim 1, wherein the monitoring circuit is further configured to at least operate based on the power source, wherein the monitoring circuit further comprises a battery for operating the monitoring circuit when the power source is not active, and wherein the monitoring circuit further comprises a battery charger for charging the battery based on at least the power source.

7. The apparatus of claim 1, wherein the monitoring circuit further comprises a network interface configured to at least wirelessly transmit the water height to at least one of a user equipment or a computer for display via a user interface.

8. The apparatus of claim 1, wherein the monitoring circuit comprises a shunt and/or current sensor electrically coupled between the power source and the power cable, and wherein the shunt and/or current sensor is configured to at least monitor current drawn by the motor over time to determine whether the motor and/or the submersible pump performance is deteriorating.

9. The apparatus of claim 1, wherein the monitoring circuit is further configured to at least determine, based on calibration, a speed of the signal propagating along the power cable providing power to the submersible pump, and wherein the monitoring circuit is further configured to at least determine the water height based on the determined speed of the signal.

10. The apparatus of claim 9, wherein the cable comprises one or more metal conductors, wherein the power cable is insulated, and wherein the speed of the signal is determined based on at least: a type of material insulating the power cable, a number of the one or more metal conductors, a medium outside of the material insulating the power cable, and whether the one or more metal conductors are twisted inside the material insulating the power cable.

11. A method comprising:
coupling, by a monitoring circuit enclosed within a removable well head cap, a signal onto a power cable connected to a submersible well pump, the signal comprising a voltage step, wherein the monitoring circuit is configured to couple between a power source and the power cable, and wherein the removable well head cap comprises an adapter interface for connecting the removable well head cap to a water well casing at a surface level;
monitoring, by the monitoring circuit, the power cable to determine a first time corresponding to a reduction in at least a voltage of the voltage step, the reduction based on the signal reaching a water surface above the submersible pump;
monitoring, by the monitoring circuit, the power cable to determine a second time corresponding to an increase in at least the voltage of the voltage step, the increase based on an impedance mismatch between the power cable surrounded by water and a motor in the submersible well pump, the increase in the voltage occurring after the reduction in the voltage; and
determining, by the monitoring circuit, a water height between the submersible pump and the water surface from at least the first time and the second time.

12. The method of claim 11, wherein the water height is determined based on at least a difference between the first time and the second time.

13. The method of claim 11, wherein a cable length between a point corresponding to a launching of the signal and the water surface is determined based on at least the first time.

14. The method of claim 11, wherein a cable length between a point corresponding to a launching of the signal and the motor is determined based on at least the second time.

15. The method of claim 11, further comprising:
generating, by the monitoring circuit, the voltage step with an initial rising voltage duration between one and ten nanoseconds, wherein the initial rising voltage occurs before the reduction in the voltage.

16. The method of claim 11, further comprising:
operating the monitoring circuit based on the power source, wherein the monitoring circuit further comprises a battery for operating the monitoring circuit when the power source is not active, and wherein the monitoring circuit further comprises a battery charger for charging the battery based on at least the power source.

17. The method of claim 11, further comprising:
wirelessly transmitting, by a network interface forming part of the monitoring circuit, the water height to at least one of a user equipment or a computer for display via a user interface.

18. The method of claim 11, further comprising:
determining, by the monitoring circuit and based on calibration, a speed of the signal propagating along the power cable providing power to the submersible pump, wherein determining the water height is based on the determined speed of the signal.

19. The method of claim 18, wherein the cable comprises one or more metal conductors, wherein the power cable is insulated, and wherein the speed of the signal is determined based on at least: a type of material insulating the power cable, a number of the one or more metal conductors, a medium outside of the material insulating the power cable, and whether the one or more metal conductors are twisted inside the material insulating the power cable.

20. The method of claim 11, further comprising:
monitoring, via a shunt and/or current sensor electrically coupled between the power source and the power cable, current drawn by the motor over time to determine whether the motor and/or the submersible pump performance is deteriorating, wherein the monitoring circuit comprises the shunt and/or current sensor.

21. A non-transitory computer-readable medium encoded with instructions that, when executed by at least one processor, cause operations comprising:
coupling, by a monitoring circuit enclosed within a removable well head cap, a signal onto a power cable connected to a submersible well pump, the signal comprising a voltage step, wherein the monitoring circuit is configured to couple between a power source and the power cable, and wherein the removable well head cap comprises an adapter interface for connecting the removable well head cap to a water well casing at a surface level;
monitoring, by the monitoring circuit, the power cable to determine a first time corresponding to a reduction in at least a voltage of the voltage step, the reduction based on the signal reaching a water surface above the submersible pump;
monitoring, by the monitoring circuit, the power cable to determine a second time corresponding to an increase in at least the voltage of the voltage step, the increase based on an impedance mismatch between the power cable surrounded by water and a motor in the submersible well pump, the increase in the voltage occurring after the reduction in the voltage; and
determining, by the monitoring circuit, a water height between the submersible pump and the water surface from at least the first time and the second time.

\* \* \* \* \*